United States Patent
Bennett

(10) Patent No.: US 6,640,141 B2
(45) Date of Patent: Oct. 28, 2003

(54) AUTOMATION SYSTEM AND METHOD FOR THE PROGRAMMING THEREOF

(75) Inventor: Raymond W. Bennett, Naperville, IL (US)

(73) Assignee: Ameritech Services, Inc., Hoffman Estates, IL (US)

( * ) Notice: Subject to any disclaimer, the term of this patent is extended or adjusted under 35 U.S.C. 154(b) by 0 days.

(21) Appl. No.: 10/140,094

(22) Filed: May 7, 2002

(65) Prior Publication Data

US 2003/0033028 A1 Feb. 13, 2003

Related U.S. Application Data

(63) Continuation of application No. 09/602,393, filed on Jun. 22, 2000, now Pat. No. 6,385,495, which is a continuation of application No. 09/201,296, filed on Nov. 30, 1998, now Pat. No. 6,112,127, which is a continuation of application No. 08/746,115, filed on Nov. 6, 1996, now Pat. No. 5,877,957.

(51) Int. Cl.[7] ............................................. G05B 19/42
(52) U.S. Cl. ..................... 700/19; 700/18; 700/86; 700/87; 700/262; 700/275; 340/286.01; 340/286.11
(58) Field of Search ..................... 700/12–15, 18, 700/19, 83, 85, 86, 87, 276, 277, 264; 340/286.01, 286.11, 286.14

(56) References Cited

U.S. PATENT DOCUMENTS

| 5,877,957 | A | * | 3/1999 | Bennett | 700/86 |
| 6,112,127 | A | * | 8/2000 | Bennett | 700/86 |
| 6,385,495 | B1 | * | 5/2002 | Bennett | 700/86 |

* cited by examiner

*Primary Examiner*—Ramesh Patel
(74) *Attorney, Agent, or Firm*—Brinks Hofer Gilson & Lione

(57) ABSTRACT

An automation system for programming appliances having programmable controllers, programmable devices and trigger devices that communicate over a communication link. The user programs the programmable devices by placing the programmable controller in its training mode, activating the trigger device to generate a trigger signed and places select programmable devices in their programmed state. After all of the desired programmable devices have been put in then programmed states, the user takes the programmable controller out of its training mode. When the programmable controller is out of its training mode, it monitors the communication link for the trigger event. Upon detecting the trigger event, the programmable controller sends messages to the selected programmable devices instructing them to go to their programmed state.

11 Claims, 13 Drawing Sheets

AUTOMATION SYSTEM AND METHOD FOR THE PROGRAMMING THEREOF

This application is a continuation of application Ser. No. 09/602,393 filed Jun. 22, 2000, now U.S. Pat. No. 6,385,495, which is a continuation of application Ser. No. 09/201,296, filed Nov. 30, 1998, now U.S. Pat. No. 6,112,127, which is a continuation of application Ser. No. 08/746,115 filed Nov. 6, 1996, now U.S. Pat. No. 5,877,957.

TECHNICAL FIELD

An automation system for controlling the behavior of an environment in response to certain events.

BACKGROUND OF THE INVENTION

Currently, automation systems which are used to control the behavior of an environment such as a home or office building are programmed using either a simple command language or using a graphical user interface that requires a computer with a monitor. These systems are expensive and require substantial investment by the user in time and energy to install and modify programming. Generally to make changes in existing programs of such systems a user must consult a user's manual or call a programming specialist. The overall utility of the automation system is drastically reduced because the user finds it difficult to adapt the system to changing needs or to make additions, deletions or modifications to the programs resident in such systems.

Home automation systems, or home management systems as they are sometimes called, commonly provide for control of lighting, heating and air conditioning, window shades or curtains, pool heaters and filtration systems, lawn sprinklers, ornamental fountains, audio/visual equipment, and other appliances. Home automation systems are frequently integrated with a home security system so that when a fire alarm is raised, for example, internal and external lights will be turned on. Security systems frequently include lighting control and other types of home automation as an option. Many larger homes incorporate a home theater which requires a certain amount of automation for convenient operation and this automation is often extended to other parts of the dwelling. In farms, the automation system will also control outbuilding heating and lighting and warn of off normal conditions in automated feeding machinery and the like.

One form of automation system includes a central control unit that monitors environmental sensors and inputs from user controls and maintains a schedule of pre-programmed time-of-day and day-of-the week events. Inputs to the central control are provided by dedicated low-voltage wiring, for example, from door and window sensors, signals carried on power lines, RF signals, signals on existing telephone wiring and, occasionally, optical signals. The central control unit is controlled by a program that is either specifically built for the particular installation or a general-purpose program with a user interface that allows the owner or a technician employed by the owner to make certain types of modifications. The interfaces to these programs can be anything from strings of digits entered on standard touch-tone keypads, for example, Home Automation Inc.'s Omni Automation and Security System, to graphical user interfaces, for example, the Molex "Choices" software.

While the graphical user interfaces can be relatively easy to use, they require the presence in the home of a personal computer and often require the system owner to purchase additional hardware and software. Systems that rely on touch tone keypads for input and one- and two-line LCD for display are less expensive, but generally require the user to remember or, more likely, lookup arbitrary commands.

The Echelon Corporation has built home automation and industrial control apparatus based on a signaling protocol they refer to as LonWorks that uses a network of nodes each of which has one or more microprocessors. The system is designed to operate in a "cooperative computing" environment in which the individual nodes maintain their own programs. Programming of the individual nodes can be done by downloading new software from a temporarily attached lap top computer or by downloading software over the LonWorks network. A similar approach has been taken by CEBus and has been used in many custom installations for larger homes and office buildings.

While such systems eliminate the central control unit, modifying the software still requires the use of a PC-based system and usually requires the user to acquire relatively expensive hardware and software and become proficient in the use of PC-based software.

It is thus desirable to provide an automation system that is inexpensive, easily installed, and easily programmable and reprogrammable. It is also desirable to provide a home automation system that can be programmed and reprogrammed by a user having little or no knowledge or experience in programming. It is also desirable to provide an automation system that allows the incorporation of new and different, appliances and controllers without the system becoming obsolete.

SUMMARY OF THE INVENTION

According to a first aspect of the present invention there is provided a method of programming at least one appliance to change state upon the occurrence of a trigger event. The method includes the steps of providing at least one programmable devices coupled to the at least one appliance, providing a programmable controller coupled to the programmable device where the programmable controller and programmable device communicate with one another. The programmable controller has a training mode which, when selected, allows the at least one programmable device to be programmed to change the state of the first appliance upon the occurrence of the trigger event. The user places the programmable controller in training mode, provides a trigger event, and changes the state of the first appliance from an unprogrammed state to a programmed state. The user then takes the programmable controller out of training mode so that the first appliance is now programmed so that upon the next occurrence of the trigger event the first appliance will change states from its unprogrammed state to its programmed state.

According to a second aspect of the present invention there is provided a system of programming at least one appliance. The system includes a programmable device coupled to at least a first appliance where the programmable device detects the state of the first appliance, and a programmable controller coupled to and communicating with the programmable device over a communication link. The programmable controller has a training mode which, when selected, allows the programmable device to be programmed to change the state of the first appliance upon the occurrence of the trigger event. When the programmable controller is put in the training mode and a trigger event occurs, and the state of the first appliance is changed and the programmable controller is taken out of the training mode, the first appliance will change to its programmed state upon the next occurrence of the trigger event.

According to a third aspect of the present invention there is provided a method for programming a home automation system. The method includes the steps of providing programmable devices located throughout a home. Each programmable device is coupled to an appliance and each programmable device can detect the state of the appliance coupled to it. Providing a programmable controller located in the home and coupled to the programmable devices by a communication link. The programmable controller has a training mode which, when selected, allows selected programmable devices to be programmed to change the state of the appliance connected thereto. Programming selected appliances to change from an unprogrammed state to a programmed state by placing selected appliances in their respective unprogrammed state, placing the programmable controller in the training mode, providing a trigger event, changing the states of selected appliances from their unprogrammed state to their programmed state and taking the programmable controller out of the training mode. The home is now programmed so that the next occurrence of the trigger event will cause the selected appliances to change from their unprogrammed states to their programmed states.

According to a fourth aspect of the present invention there is provided a method of programming at least one appliance. The method includes the steps of providing a programmable controller coupled by a communication link to the at least one appliance, placing the programmable controller in the training mode, broadcasting a trigger event over the communication link wherein the trigger event is received and stored by the programmable controller, changing the state of the at least one appliance from an unprogrammed state to a programmed state, deleting the change of state of the at least one appliance, broadcasting a message over the communication link indicating that the programmed state of the at least one appliance wherein the message is received and stored by the programmable controller, and taking the programmable device out of the training mode. The at least one appliance is programmed to go to its programmed state upon the occurrence of the trigger event.

According to a fifth aspect of the present invention there is provided a method for automating an environment. The method includes the steps of providing programmable device coupled to a communication link, providing a programmable controller having memory, wherein the programmable controller is coupled to the communication link wherein the programmable controller and programmable device communicate with one another over the communication link, providing a trigger device coupled to the communication link wherein the trigger device and programmable controller communicate with one another, placing the programmable controller in a training mode, activating the trigger device to generate a trigger signal, storing the trigger signal in the memory of the programmable control, placing the programmable device in a desired state, broadcasting a message that the programmable device is in the desired state, storing the message in the memory of the programmable controller, taking the programmable controller out of the training mode, monitoring the communication link for the trigger event, detecting the trigger event, and broadcasting a control signal over the communication link to the programmable device to change to its desired state.

DETAILED DESCRIPTION OF THE PRESENTLY PREFERRED EMBODIMENTS

Figure 1:
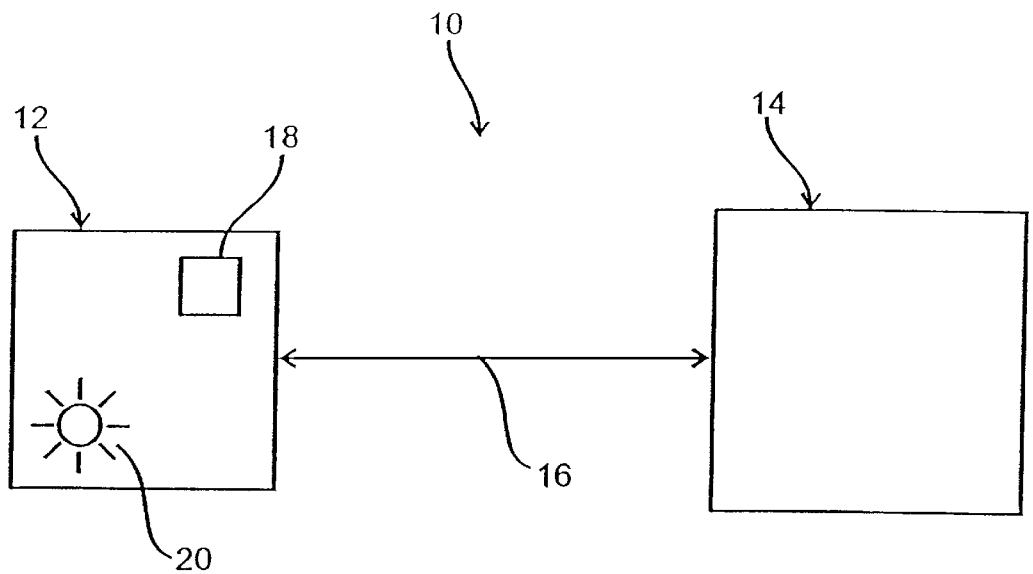
FIG. 1 is a schematic of an automation system according to a preferred embodiment of the present invention.

FIG. 1 is a perspective view of an automation system 10 according to a preferred embodiment of the present invention. In its simplest embodiment the automation system 10 includes a programmable controller 12, a programmable device 14, and a communication link 16 coupling the programmable controller 12 and the programmable device 14 so that they can communicate with one another. The programmable controller 12 has a user accessible control or train button 18 to place the programmable controller 12 in training mode and take the programmable controller out of training mode. Training mode refers to the state in which the programmable controller 12 is in when it is being programmed. In a preferred embodiment the user accessible control 18 is a push down button which places the programmable controller 12 in training mode and when pushed again to release the button takes the programmable controller 12 out of training mode. The user accessible control 18 will be referred to hereinafter as the "train button." Optionally, the programmable controller 12 may also be equipped with an indicator 20 such as an LED which is illuminated when the programmable controller 12 is in training mode and is extinguished when the programmable controller is not in training mode. The programmable device 14, which will be described in detail hereinafter, broadcasts messages to and receives messages from the programmable controller 12 over communication link 16.

First a brief description of the operation of the automation system 10 will be given followed by a detailed description of various preferred embodiments of the components of the automation system 10. The automation system 10 is programmed by demonstrating what should happen in response to a particular event. For example, if the automation system 10 is installed in a home, the programmable controller 12 is preferably mounted in a 9 wall of the home, for example, where the user will have access to the train button 18. The programmable device 14 is also located in the home and the communication link 16 between the programmable controller 12 and the programmable device 14 is provided by the power lines in the home. If the user wants the programmable device 14 to go to a programmed state upon the occurrence of a particular event, i.e. a trigger event, the user first places the programmable controller 12 in its training mode by depressing the train button 18, and then causes a trigger signal which will be described hereinafter, that is received by programmable controller 12 over the communication link 16. The user then walks over to the programmable device 14 he or she wishes to be controlled by the trigger event and puts the programmable device 14 in the desired programmed state. For example, if the programmable device is a lamp, the programmed state may be turning the lamp on. The user then walks back to the programmable controller 12 and takes it out of its training mode using the train button 18. Now the automation system 10 is programmed so that upon the next occurrence of the trigger event, the programmable device 14 will go to the desired programmed state. A detailed description of the communications over communication link 16 will be described hereinafter.

The trigger event can be generated in numerous ways. For example, as will be seen hereinafter, programmable devices 14 frequently generate messages which can be regarded as trigger events by the programmable controller 12. In operation, the programmable controller 12 can receive a number of messages that might be trigger events and other messages that might be generated by the user putting programmable devices 14 into their programmed state. The trigger event is selected as the event which generated the first message received by the programmable controller after it is placed in training mode. For example, if the trigger event is generated by an environmental sensor coupled to the communication link 16, the trigger event may be the detection of a movement in the field of view of the sensor, the opening or closing of a door or window, the detection of an alarm condition. The trigger event can also be generated by a programmable device where the trigger event is the change of state of the programmable device. For example, the user may want a second programmable device to go to a desired programmed state every time a first programmable device goes to a particular programmed state. Putting the first appliance in its programmed state after the programmable controller 12 is in the training mode is the trigger event. Generally the trigger event can be any signal broadcast over communication link 16 to the programmable controller 12. The trigger event is preferably the first detected signal by the programmable controller 12 after it has been put in training mode. Various programming sequences and trigger events will be described hereinafter.

The programmable device 14 illustrated in FIG. 1 is able to broadcast messages over the communication link 16 indicating a change in its state and also receive signals over the communication link 16 to control its operation. The programmable device 14 includes but is not limited to appliances such as switches, lamps, dishwashers, curtain controls, audio and video equipment, thermostats, lawnsprinklers, etc.

Figure 1A:
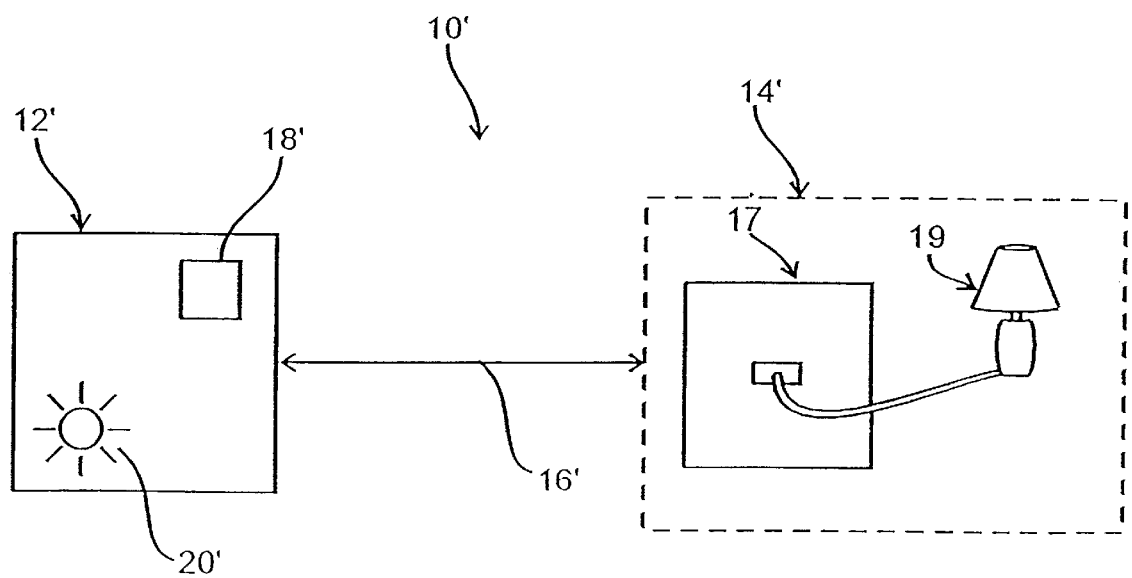
FIG. 1a is a schematic of an automation system according to another preferred embodiment of the present invention.

FIG. 1a is a perspective view of an automation system 10' according to another preferred embodiment of the present invention. FIG. 1a is similar to FIG. 1 except that the programmable device 14' is divided into a programmable outlet 17 and an appliance 19. In a preferred embodiment, the programmable outlet 17 is plugged into the power line and provides a socket into which an appliance 19, such as a lamp, can be plugged. The programmable outlet 17 detects a change in state of the appliance coupled thereto and broadcasts a message over the communication link 16' that the appliance 19 has changed states. While a lamp is shown as the appliance in this preferred embodiment, the present invention is not limited to such appliances but includes other appliances such as switches, dishwashers, curtain controls, audio and video equipment, etc. The term appliance is used broadly to encompass any device that can change its state at least from one state to another.

While the particular embodiment described with reference to FIGS. 1 and 1a have the power lines of a home establishing the communication link 16, the present invention is not limited to such a communication media. Other media may be used such as RF transmissions, messages over dedicated wiring, messages sent as data over phone lines using frequencies not used by voice signals, optical signals, etc. In addition, while only one programmable device 14 is shown in FIGS. 1 and 1a, a plurality of programmable devices can be provided to communicate with one or a plurality of programmable controllers 12 all coupled by communication link 16. Later, a description of preferred embodiments of the present invention applied to a home automation system will be described.

Figure 2:
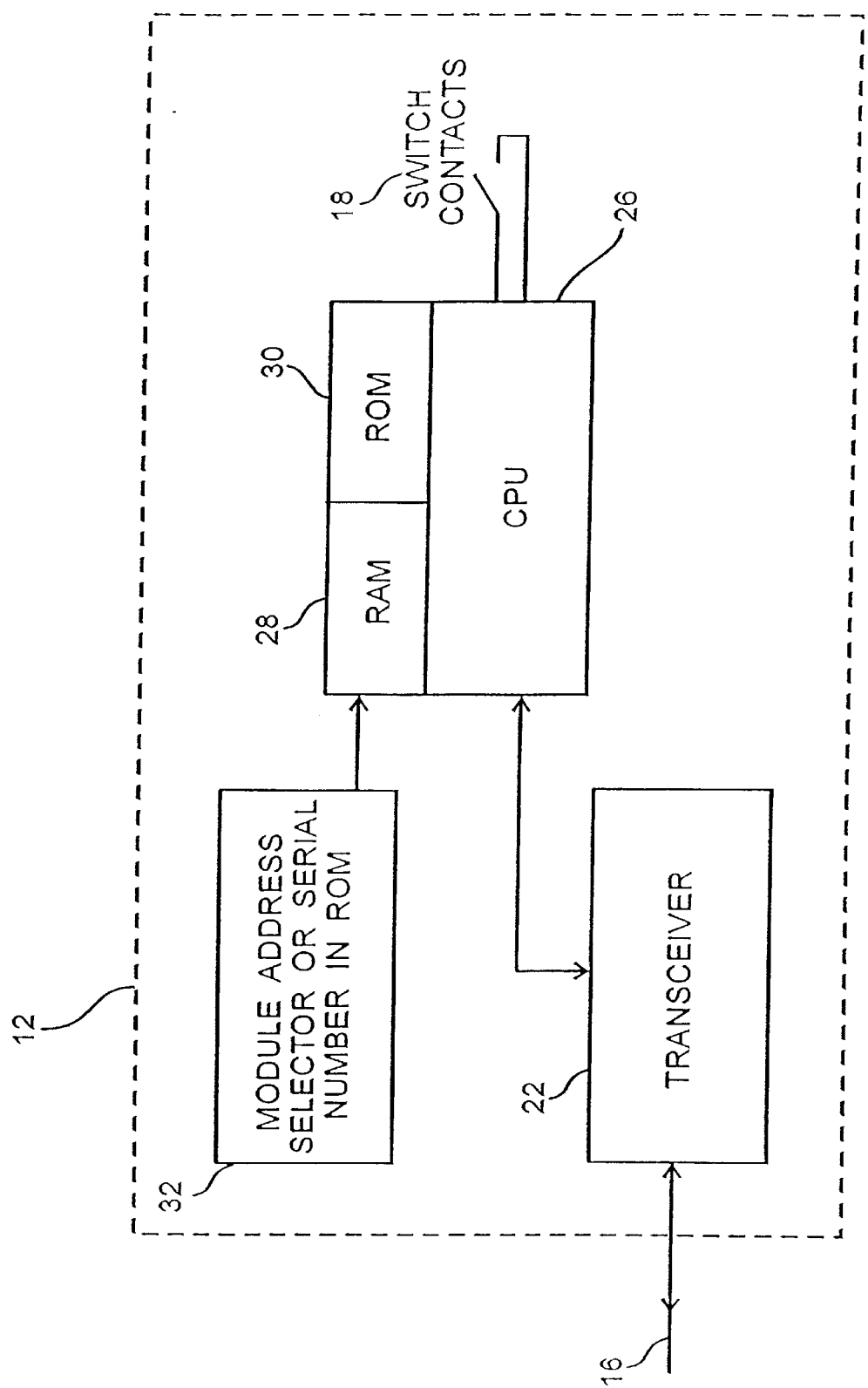
FIG. 2 is a block diagram of the programmable controller shown in FIGS. 1 and 1a according to a second preferred embodiment of the present invention.

FIG. 2 is a block diagram of the programmable controller 12 shown in FIGS. 1 and 1a according to a preferred embodiment of the present invention. The programmable controller 12 includes a transceiver 22, a microprocessor 26 preferably having both RAM memory 28 and ROM memory 30 and train button 18. The microprocessor 26 is coupled to the transceiver 22 which in turn is coupled to the communication link 16. The transceiver 22 receives messages from the communication link 16 and sends messages over the communication link 16. The train button 18 is coupled to the microprocessor 26 and places the programmable controller 12 either in or out of training mode. The programmable controller 12 has an address identified with it which may be stored in ROM 30 or alternatively, an address selector 32, coupled to the microprocessor 26, can be provided to allow the address of the programmable controller 12 to be selected.

Figure 3:
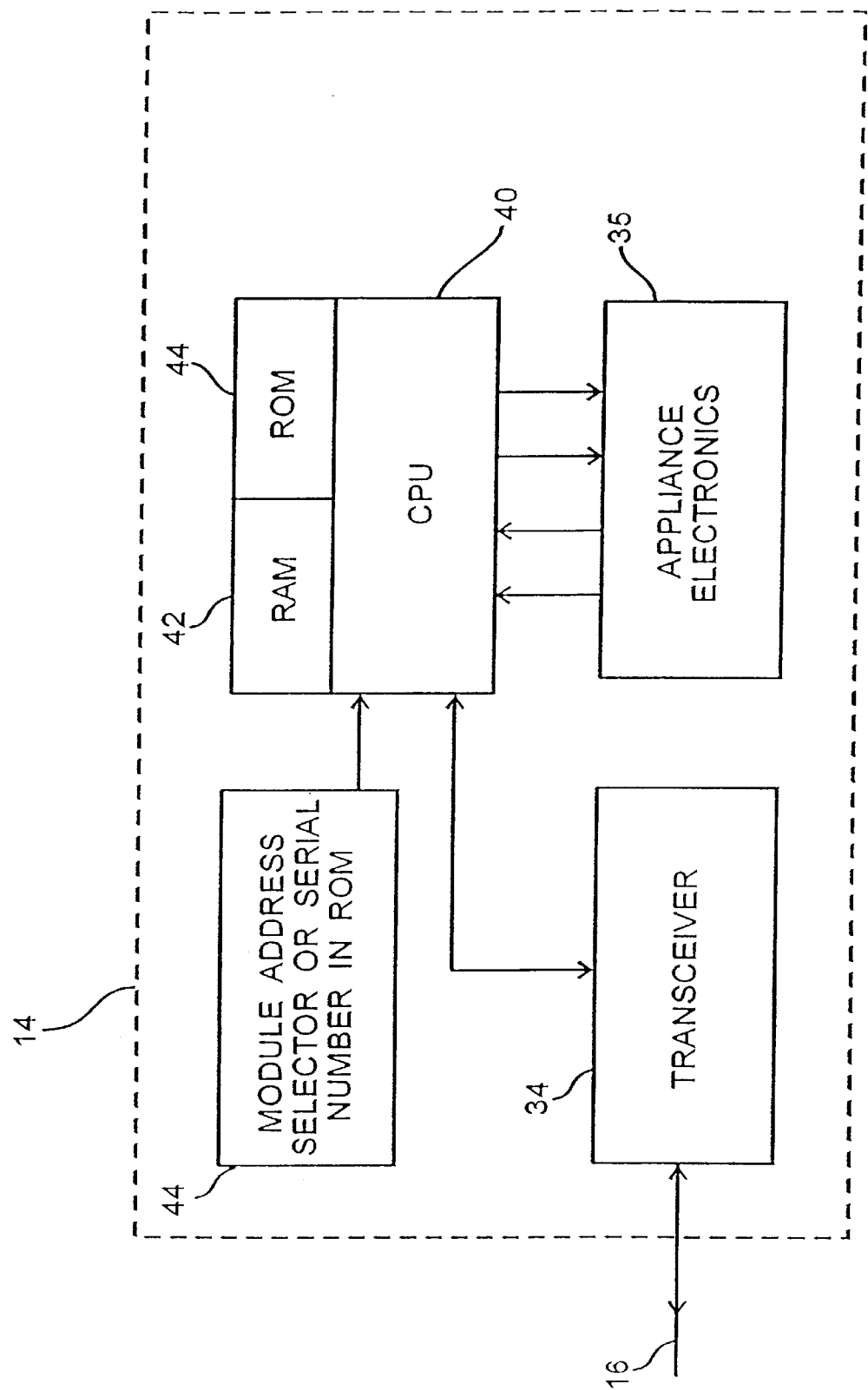
FIG. 3 is a block diagram of the programmable device shown in FIG. 1 according to a third preferred embodiment of the present invention.

FIG. 3 is a block diagram of the programmable device 14 shown in FIG. 1 according to a preferred embodiment of the present invention. The programmable device 14 includes a transceiver 34 appliance electronics 35, and a microprocessor 40 preferably having both RAM memory 42 and ROM memory 44. The microprocessor 40 is coupled to the transceiver 34, and appliance electronics 35. The transceiver 34 is coupled to the communication link 16 to receive and broadcast messages over the communication link 16. The programmable device 14 has an address identified with it which may be stored in ROM 42 or alternatively, an address selector 44, coupled to the microprocessor 40, can be provided to allow the address of the programmable device 14 to be selected.

In the preferred embodiment illustrated in FIG. 3, the programmable device 14 is like that shown in FIG. 1 in which it is integrated into the appliance itself.

Figure 3A:
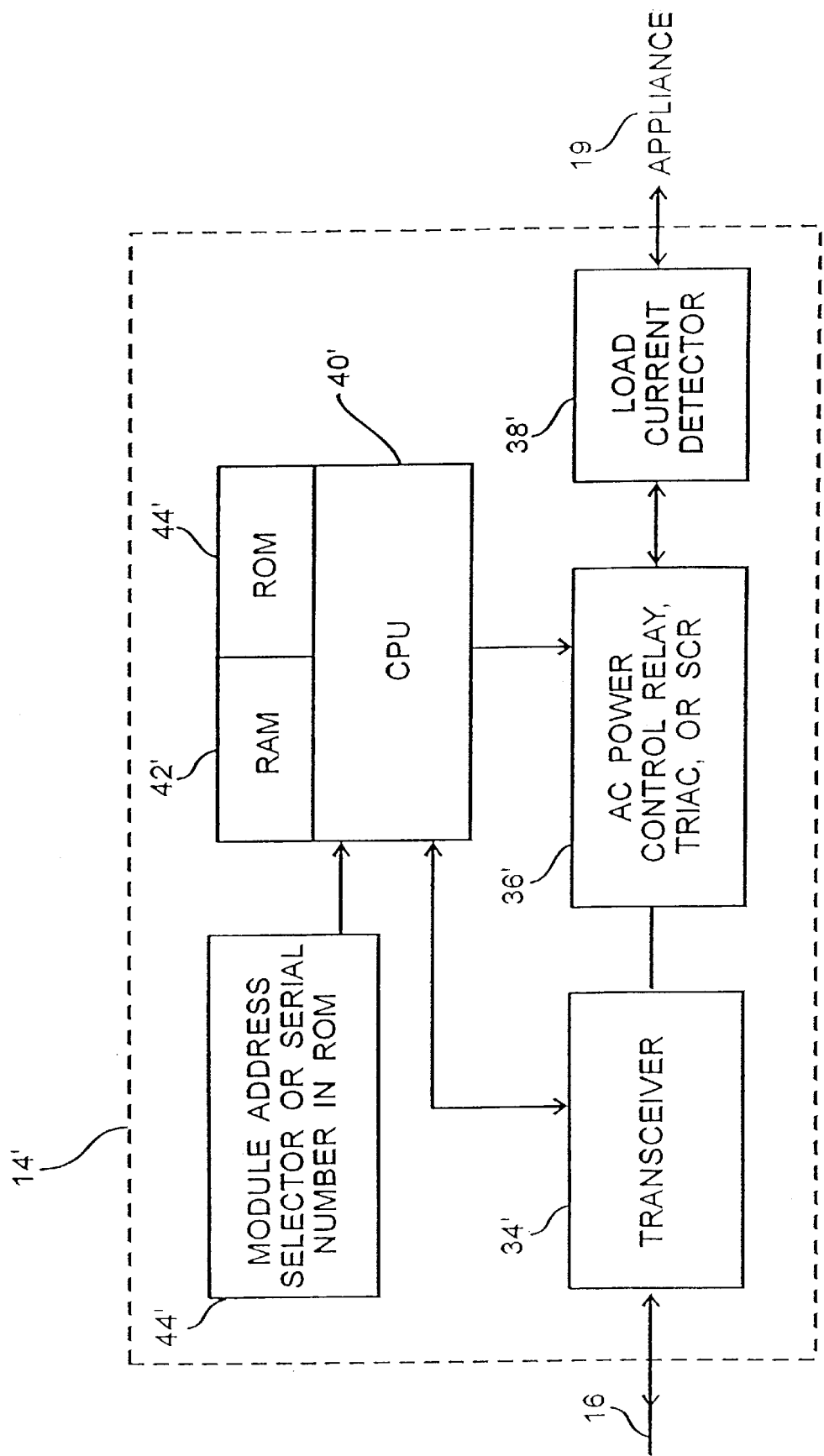
FIG. 3a is a block diagram of the programmable device shown in FIG. 1a according to a preferred embodiment of the present invention.

FIG. 3a is a block diagram of the programmable device 14' shown in FIG. 1a according to a preferred embodiment of the present invention. The programmable device 14' includes a transceiver 34', a control relay 36, a load detector 38, and a micro-processor 40' preferably having both RAM memory 42' and ROM memory 44'. The microprocessor 40' is coupled to the transceiver 34', control relay 36 and load detector 38. The transceiver 34' is coupled to the communication link 16 to receive and broadcast messages over the communication link 16. The load detector 38' is coupled to an appliance 19 (see FIG. 1a). The programmable device 14' has an address identified with it which may be stored in ROM 42 or alternatively, an address selector 44', coupled to the microprocessor 40', can be provided to allow the address of the programmable device 14' to be selected.

In the preferred embodiment illustrated in FIG. 3, the programmable device 14' is like that shown in FIG. 1a which includes an outlet that is plugged into the power line and provides a socket into which the appliance 19, such as a lamp, for example, can be plugged into. In such an embodiment, the load detector 38 detects a change in state of the appliance coupled to the programmable device 14', i.e. the appliance begins drawing power or ceases drawing power or the amount of power the appliance is drawing.

Figure 4:
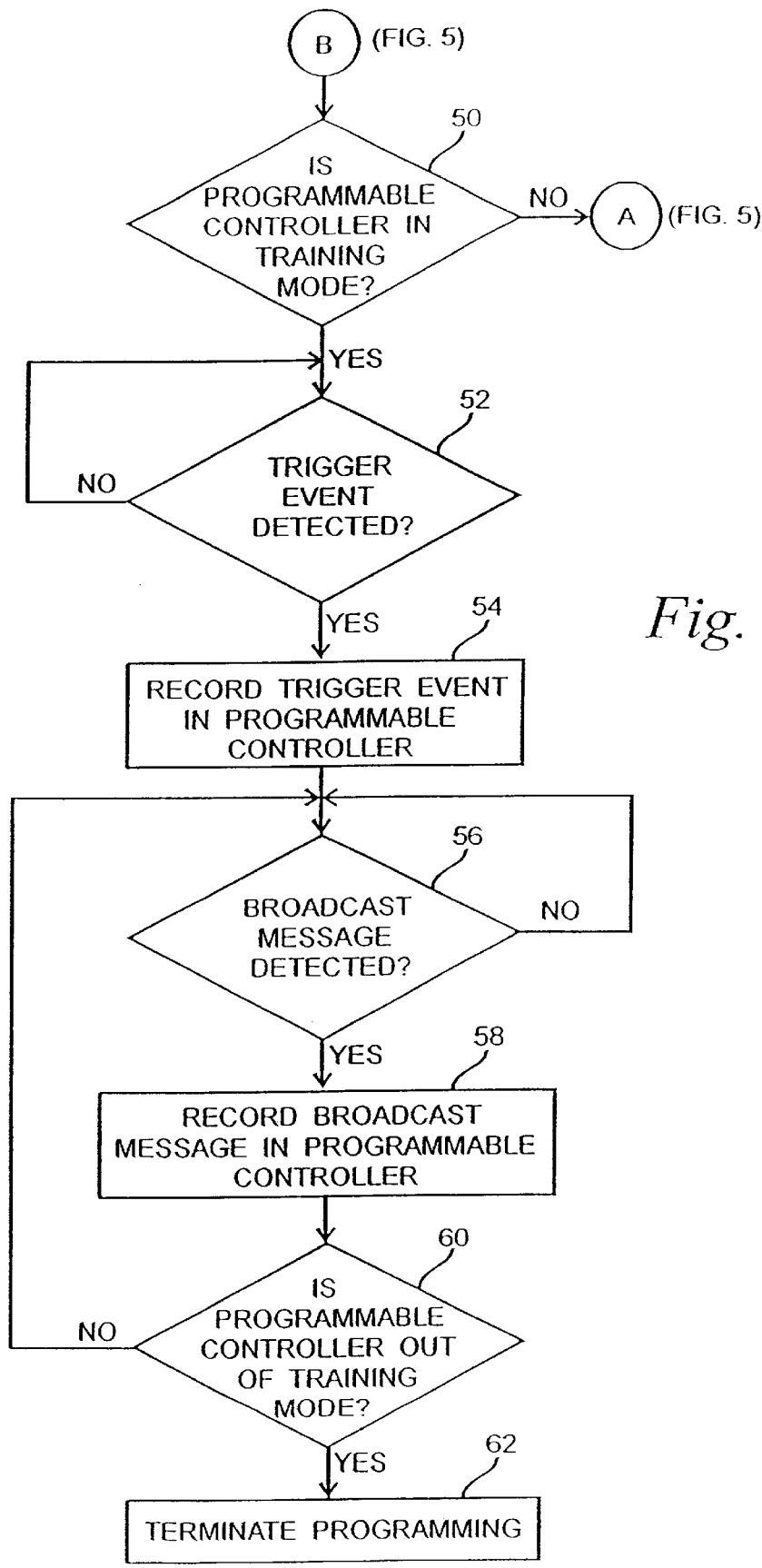
FIGS. 4–5 are flow charts illustrating the communication protocol between the programmable controller and programmable device according to a preferred embodiment of the present invention.

The communication between the programmable controller 12 and the programmable device will now be described with reference to the flow chart shown in FIG. 4. At block 50 it is determined whether the programmable controller 12 has been put in training mode. If it has not, control is passed to block 64 shown in FIG. 5. If it has then control is passed to block 52 where it is determined whether a trigger event has been detected over the communication link 16. If a trigger event has been detected, that trigger event is recorded in the RAM 28 of the programmable controller 12 in block 54. If a trigger event has not been detected, the programmable controller 12 waits for the detection of a trigger event.

After the trigger event has been detected and recorded, control is passed to block 56 where it is determined whether a message has been broadcast by a programmable device 14 over the communication link 16. If a message is detected, control is passed to block 58 where the broadcast message is recorded in the RAM 28 of the programmable controller 12. If a broadcast message has not been detected, the programmable controller 12 waits for a broadcast message. After a broadcast message has been detected and recorded, control is passed to block 60 where it is determined whether the programmable controller 12 has been taken out of training mode. If it has, control is passed to block 62 and the programming is terminated. If not, control is passed back to block 56 where the programmable controller 12 waits for another message to be broadcast by another programmable device. This cycle continues until the programming has been terminated.

The recording of the trigger event and broadcast messages by the programmable controller creates a program stored by the programmable controller 12. Of course many programs formed by trigger events and the broadcast messages associated therewith can be stored by the programmable controller. In FIGS. 1 and 1a only one programmable device 14 is shown, however, it is to be understood that a plurality of programmable devices can be coupled to the communication link 16 in which case the programmable controller 12 may receive more than one broadcast message. In particular, according to a preferred embodiment of the present invention, the trigger signal will have associated with it a unique identifier which will be recorded by the programmable device 12. The message(s) broadcast by the programmable device(s) will each have associated with it the programmable device's unique address, preferably a byte or two in length, followed by a message. The message of the broadcast signal may specify that the device has been turned on or off or that a particular percentage of energy is being drawn, for example. In addition, particularly for the embodiment shown in FIG. 1, the message includes instructions which will be broadcast back to the programmable device to cause it to mimic the action that was just taken. This message will be broadcast back to the programmable device by the programmable controller upon the next occurrence of the trigger event when the programmable controller 12 is out of training mode. This is particularly useful when the programmable device 14 is like that shown in FIG. 1 because the programmable controller 12 does not have to know anything about the configuration of the programmable device 14 The programmable device 14 provides its own instruction in the message it broadcasts to the programmable controller.

This allows the automation system 10 to easily accommodate new types of appliances and controllers. For example, suppose that at some future time it became popular to install lighting where the user could control not only the intensity of a programmable light fixture (on, off and various dimming levels), but also the color of the light. For existing automation systems, in order to add color control it would be necessary for system controllers to receive new programming that at the minimum expanded the message set defining control of lighting from one that referred only to intensity to one that specified color and intensity.

In a preferred embodiment of the present invention a simpler and more general solution to the problem of adding new devices to be controlled without making any modifications of the existing system components exists. For example, in the case of a lighting appliance that allows the user to adjust both color and intensity, a user control panel could be provided so that the user could use one control to adjust intensity and another control to adjust color of the indirect lights in a room. Using programming methods previously discussed, the user could then program the programmable controller to provide a soft "white" indirect light when a small table lamp was turned on and to provide bright white light when a particular floor lamp was illuminated. To make this programming possible without making any changes in the programmable controller, the new lighting fixture would be a programmable device that would broadcast a message to the programmable controller that contained within that message an instruction that should be sent back to the lighting appliance in order to duplicate the setting the user had selected from the control panel. The programmable controller stores the message that should be sent to the new lighting fixture, and in the future when the trigger event was detected it would direct the stored message to the new lighting appliance. The programmable controller doesn't need to "know" anything about the operation of this new programmable device and doesn't even need to know it is a light.

Figure 5:
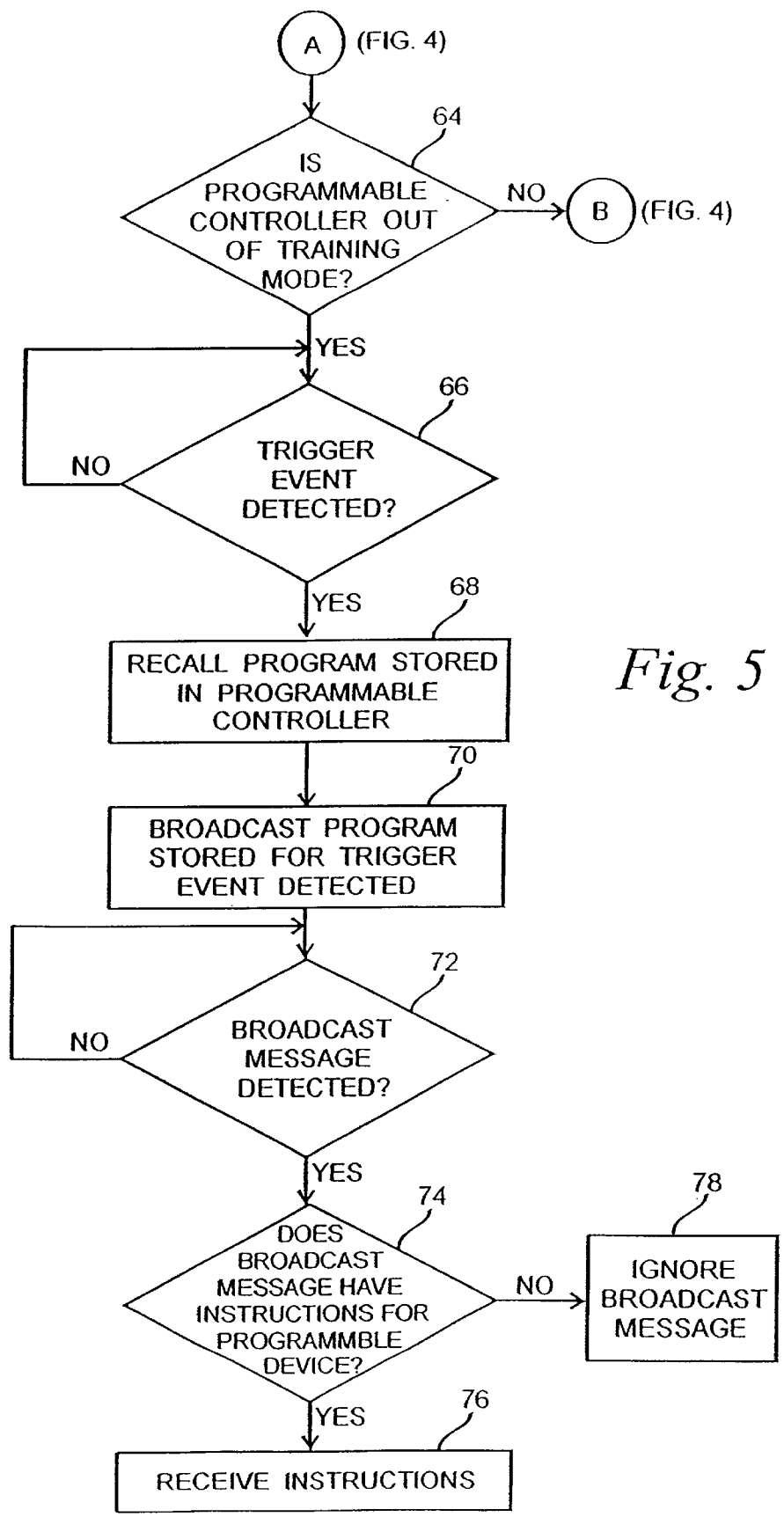

When the programmable controller 12 is out of its training mode, it monitors the communication link 16 for recognizable trigger events. FIG. 5 is a flow chart illustrating the communications over communication link 16 when the programmable controller 12 is out of its training mode. At block 64 it is determined whether the programmable controller 12 is out of its training mode. If it is not, control of the program is transferred to block 50 as shown in FIG. 4. If it is, control is passed to block 66 where it is determined whether a trigger event has been detected. If one has not, control is returned to block 66 where the programmable controller 12 waits for the detection of a trigger event. Once a trigger event has been detected control is passed to block 68 where the program stored in the RAM 28 of the programmable controller 12, associated with the particular trigger event detected, is recalled. Then at block 70, the program stored in RAM 28 of the programmable controller 12 is broadcast over communication link 16. The programmable devices 14 coupled to the communication link 16 listen for broadcasted messages. At block 72 each programmable device 14 coupled to communication link 16 detects whether a message has been broadcast. Control is then passed to block 74 where it is determined whether the program broadcast includes any message for particular programmable devices. If it does, control is passed to block 76 where the programmable devices detect this by matching their unique address with the addresses in the broadcast program. If it recognizes its address, the programmable device receives its designated message in the program and executes the instructions associated with that message. If not, control is passed to block 78 where the message is ignored. Each programmable device coupled to the communication link checks the program broadcast by the programmable controller to see if any of the messages contained therein are for it.

Signaling protocols such as X-10 (a proprietary protocol of the X-10 Corporation), CEBus (an EIA standard backed by an industry consortium) or Lon Works (a standard owned and maintained by the Echelon Corporation) may be used for the communication protocol over communication link 16.

Figure 6:
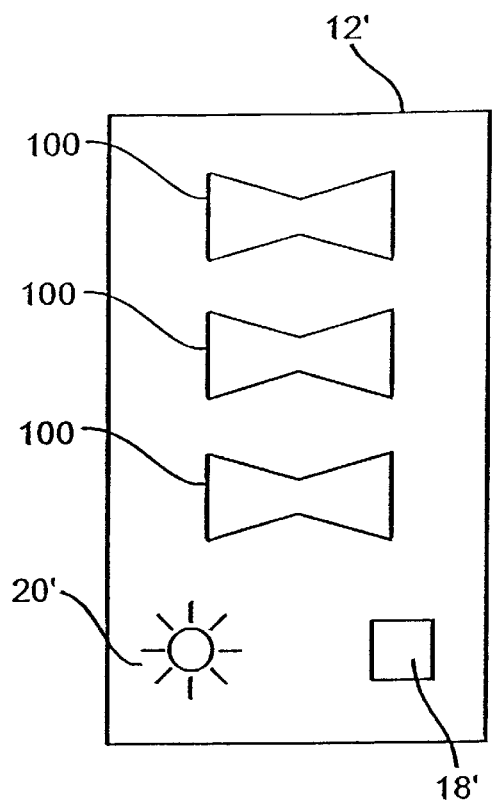
FIG. 6 illustrates the front panel of a programmable controller incorporated with a bank of switches according to a preferred embodiment of the present invention.
Figure 7:
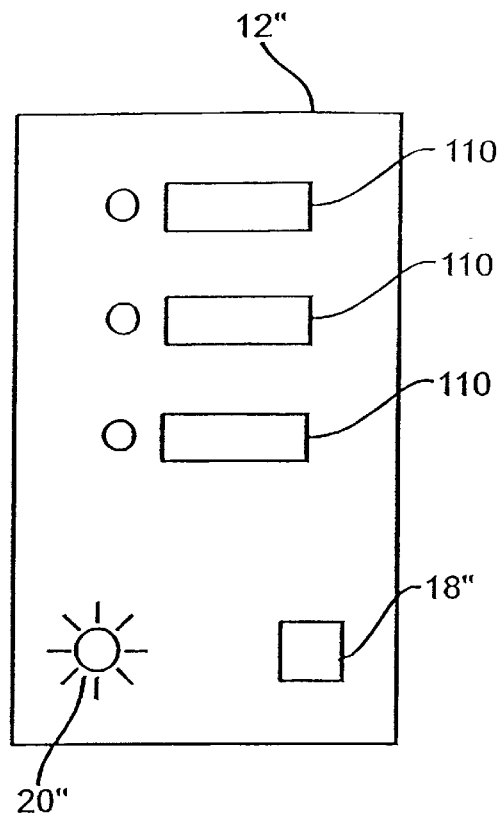
FIG. 7 illustrates the front panel of a programmable controller incorporated with a bank of push buttons according to a preferred embodiment of the present invention.
Figure 8:
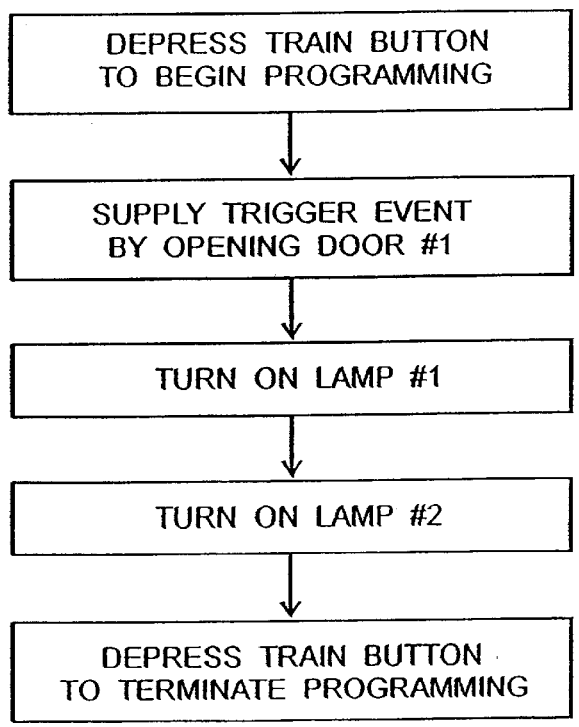
FIGS. 8–12 are flow charts illustrating various program sequences.
Figure 9:
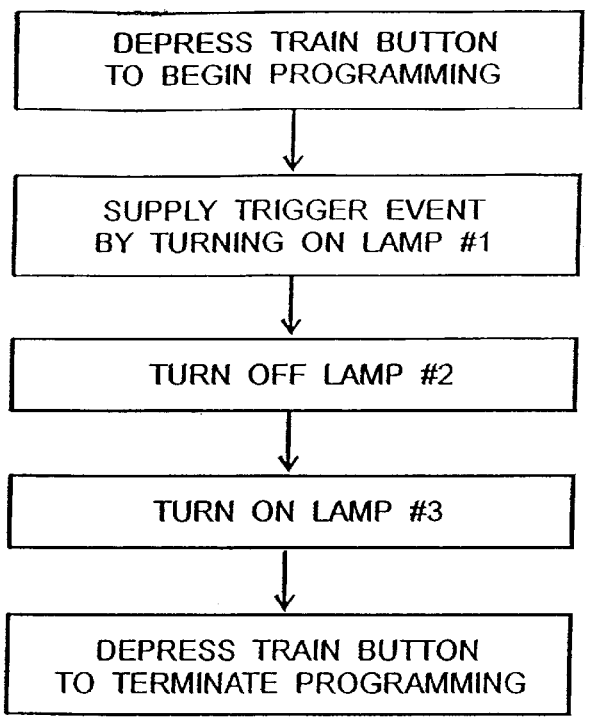
Figure 10:
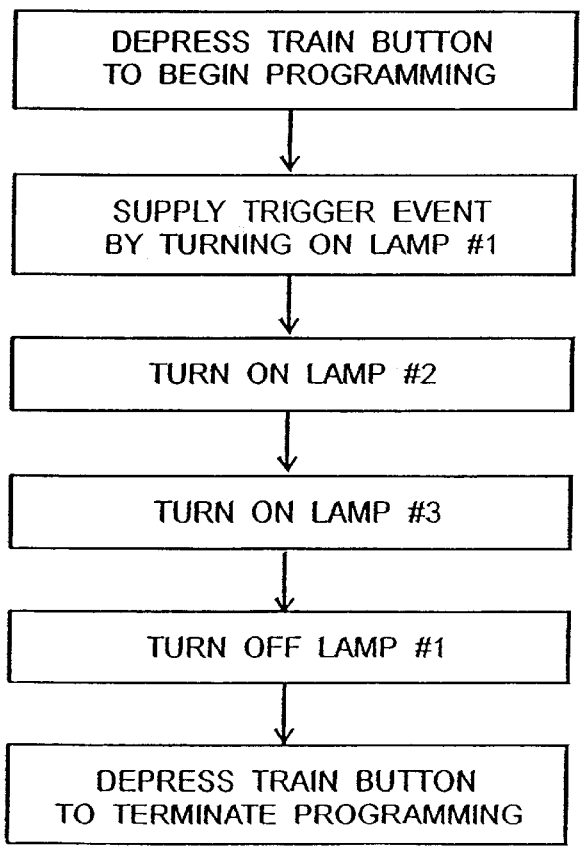
Figure 11:
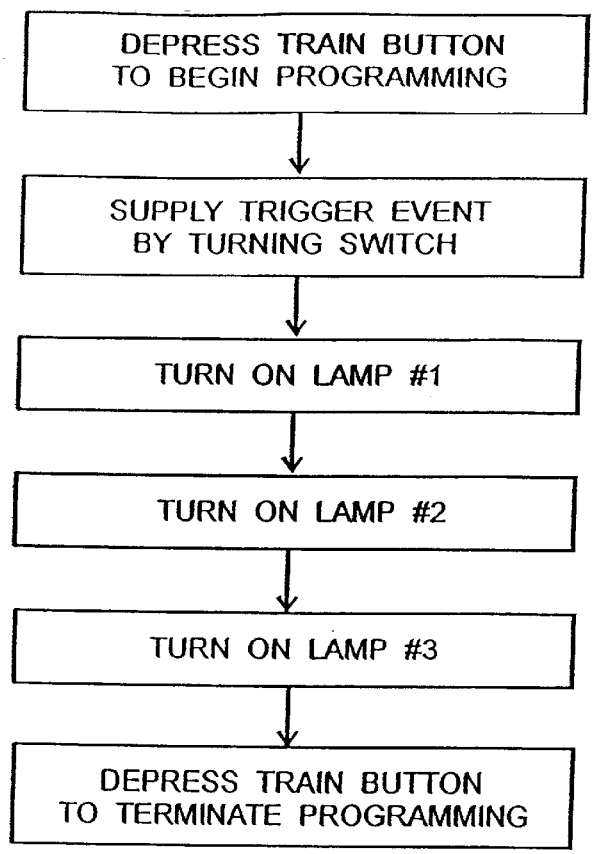
Figure 12:
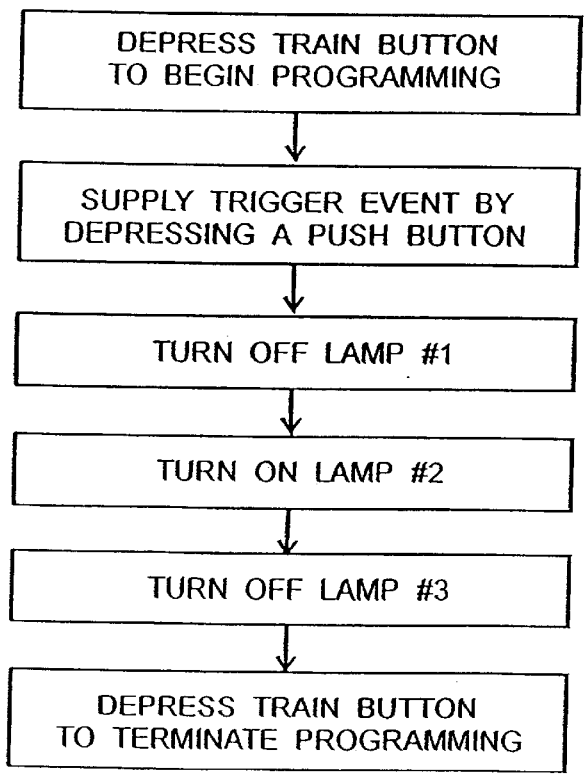

The programmable controller may be incorporated into more complex systems depending upon the particular application to which it will be subjected. FIG. 6 illustrates a programmable controller 12' incorporated with a bank of switches 100 according to a preferred embodiment of the present invention. FIG. 7 illustrates a programmable controller 12" incorporated with a bank of push buttons 110 according to a preferred embodiment of the present invention.

The programmable controllers 12' and 12" shown in FIGS. 6 and 7 respectively are particularly useful for two types of programming. A first type, which will be referred to as "Type I" programming, causes programmable devices coupled over a communication link 16 to the programmable controller and selected to be programmed to all go to the same state when the trigger event occurs. For the simplest variety of Type I programming, all of the selected programmable devices have just two states; for example, on and off. The trigger event also has two states, for example, on and off. When the trigger event is put in its on state, all of the selected programmable devices go to their on state. When the trigger event is put in its off state, all of the selected programmable devices go to their off state. Of course, the programmable devices and trigger event may have more than two states. For example, suppose that the trigger event is supplied by a programmable dimmer switch and the selected programmable devices are light fixtures attached to the programmable dimmer switch. For Type I programming, all of the lighting fixtures would respond to changes in the setting of the trigger dimmer in the same way. The programmable devices and trigger event do not have to be identical in state but they do have to be congruent in the sense of having operational states that can be mapped onto each other. For example, suppose there are three programmable devices 14' according to the preferred embodiment shown in FIG. 1*a* where each appliance 19 is a lamp. If the user wants to program all of the lamps to turn on based upon the occurrence of a trigger event, the user performs the following sequence:

press the train button 18' to place the programmable controller 12' in its training mode to commence programming;

supply a Type I type trigger event (i.e., depress one of the bank of switches 100)

turn lamp 1 on;

turn lamp 2 on;

turn lamp 3 off; and deactivate the user control to take the programmable controller out of training mode to conclude programming.

Now, upon the next occurrence of the trigger event when the programmable controller is out of its training mode, lamps 1, 2 and 3 will all turn on. The actual state of the appliances during programming is immaterial, the important feature is that the user touched the appliance during programming regardless of whether the appliance was turned on or off. The bank of switches 100 shown in FIG. 6 are particularly useful in such an application.

The second type of programming, which will be referred to as "Type II" programming, associates discrete events with specific commands to be sent to the programmable devices. For Type II programming the state of the appliance during programming is material. Thus, if the above sequence was programmed using Type II programming, lamps 1 and 2 would turn on and lamp 3 would turn off upon the occurrence of the trigger event. The bank of push buttons 110 shown in FIG. 7 are particularly useful for Type II programming.

The determination of whether Type I or Type II programming is taking place is arbitrary and the present invention is not limited to the particular examples given. Whether the programming is of Type I or Type II is inferred from the trigger event and from what programmable devices that are to be controlled by that trigger event. If the trigger event is supplied by an on/off switch and if the appliances to be controlled all have on and off states, it may be assumed that Type I programming is being performed. If the trigger event is supplied by a momentary contract device or the opening of a door, then it may be assumed that Type II programming is being performed. If the trigger event is supplied by an appliance whose state is reversible, the lamp can be turned either on or off, it may be assumed that either Type I or Type II programming is being performed. In a preferred embodiment it is assumed that the programming is Type II. While particular assumptions have been described linking certain events to Type I or Type II programming, other embodiments, which would be obvious to those of ordinary skill in the art in light of the teachings of the present invention, may be implemented. In a preferred embodiment, the programmable controller decides the programming mode.

The programmable controllers and programmable devices according to the preferred embodiments of the present invention allow a user to create a program by a simple, program by demonstration technique. No knowledge of programming is needed and creating, modifying or deleting programs can be simply implemented by the user. The user simply physically demonstrates what is to occur upon the detection of a trigger event.

FIGS. 8–12 are flow charts illustrating examples of steps used to program various sequences in response to various trigger events. It is assumed that the programmable controller and programmable devices are located in a home automation system for all of the sequences shown in FIGS. 8–12. The sequence shown in FIG. 8 trains the house to turn Lamp 1 on and Lamp 2 off when a door is opened. The sequence shown in FIG. 9 causes Lamp 2 to be turned off and Lamp 3 turned on whenever Lamp 1 is turned on. In this case turning Lamp 1 on is the trigger event. The sequence shown in FIG. 10 programs the house to turn Lamp 2 and Lamp 3 on when Lamp 1 is turned on. In a preferred embodiment the last event, turning Lamp 1 off, is ignored since for the purpose of this training sequence Lamp 1 is a trigger event and all trigger events subsequent to the occurrence of the first trigger event are ignored. In other applications it may not be appropriate to ignore subsequent trigger events. The sequence shown in FIG. 11 programs the home to turn Lamps 1, 2 and 3 on every time one of the bank of switches 100 shown in FIG. 6 is turned on. Because one of the bank of switches 100 was used as the trigger event, it was assumed that Type I programming was implemented which cause all of the selected appliances to go to the same state as the trigger event regardless of their actual state during programming. Alternatively, the sequence shown in FIG. 12 programs the house to turn Lamps 1 and 3 off and Lamp 2 on every time one of the push buttons 110 shown in FIG. 7 is depressed. Even though the same steps were performed after the trigger event as occurred in FIG. 11, because one of the push buttons 110 of the programmable was used as the trigger event it was assumed that Type II programming was implemented which causes all of the selected appliances to go to their individual programmed states. As already described the assumptions made with respect to Type I and Type II programming are arbitrary and the present invention is not limited to the particular examples given.

These are but some of the programming sequences that can be implemented using the programmable controller and programmable devices according to the present invention. The present invention, however, is not limited to these particular sequences.

Adding, changing or deleting existing programs is also simply implemented. In a preferred embodiment, if the system has learned a response to a particular trigger event, to delete responses associated with that particular trigger event one need only put the programmable controller in the training mode, supply the particular trigger event and then take the programmable controller out of the training mode. To clear all programming one need only put the programmable controller in the training mode and then directly take the programmable controller out of the training mode. Of course, in a particular application if the risk of inadvertently erasing programming outweighs the convenience of being able to "start over," the designer could elect to not implement the "erase all" function, to require the user to perform the "erase all" action twice in succession before it took effect, or even to provide a separate "delete" button that was protected from accidental manipulation.

Figure 13:
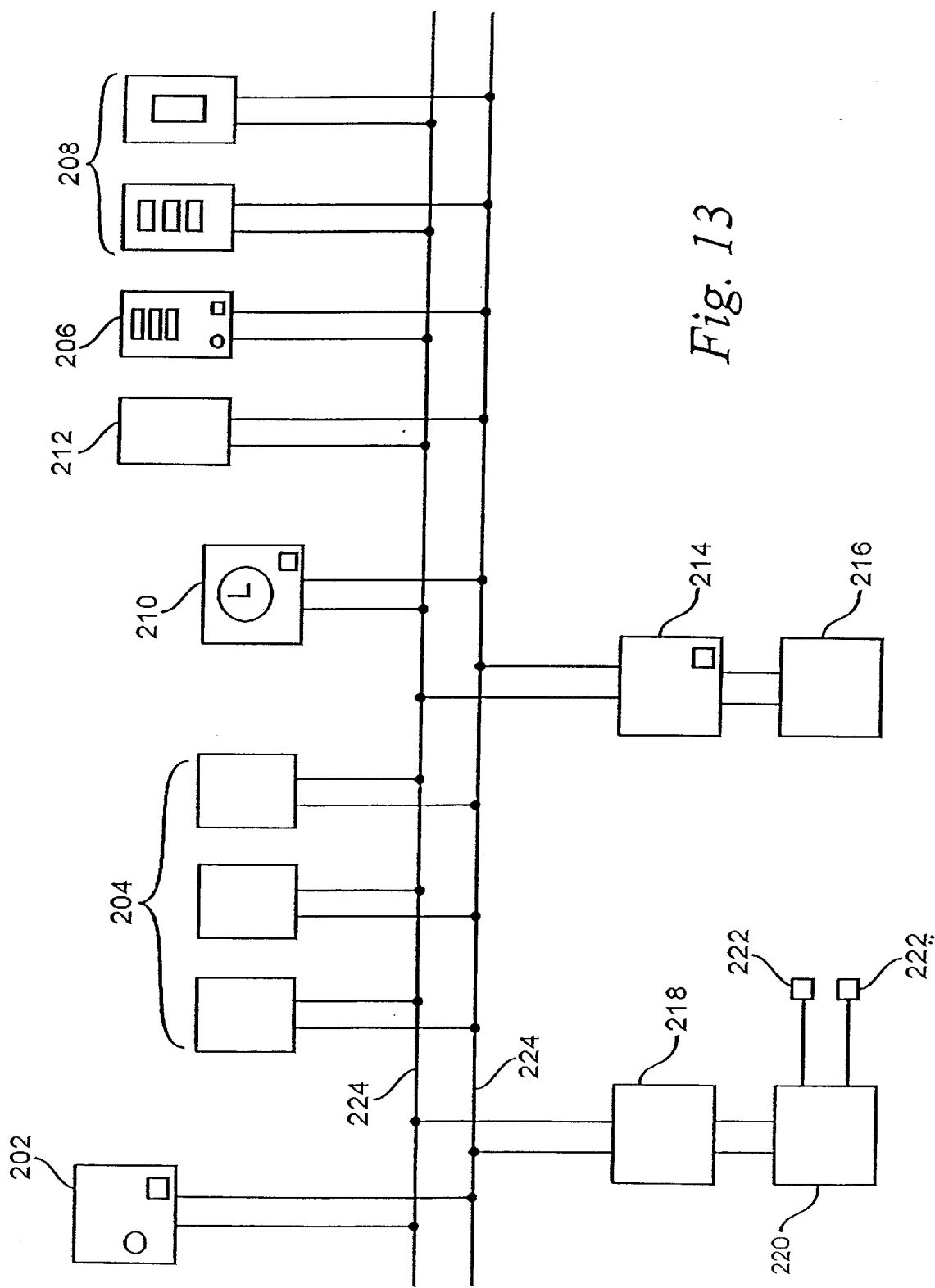
FIG. 13 is a of the wiring and components schematic for a home automation system according to a preferred embodiment of the present invention.

The programmable controllers and programmable devices according to the preferred embodiments already described can be incorporated into a larger system to support, for example, home automation. FIG. 13 is a schematic of the wiring and components for a home automation system according to a preferred embodiment of the present invention. The automation system 200 preferably includes the following components: a first programmable controller 202, a plurality of programmable devices 204, a second programmable controller 206, a plurality of wall switches 208, a programmable clock 210, a programmable light fixture 212, a programmable thermostat 214 coupled to a HVAC interface 216, a security interface 218 and a security panel 220, and a plurality of environmental sensors 222. As will be described, all of these components communicate with one another preferably over the power lines 224 of the house in which they are installed. The embodiment shown in FIG. 13 is merely exemplary and the present invention is not limited to such an embodiment.

The programmable controller 202 is preferably of the type shown in FIG. 1 where it has a user access control 203 to put the programmable controller 202 in and out of training mode. The plurality of programmable devices 204 are preferably of the type shown in FIGS. 1 and 1a. Programmable controller 206 is preferably of the type shown in either FIG. 6 or 7. The switches 208 are preferably programmable so that they broadcast messages over the communication link 224 and receive messages broadcast over the communication link 224.

Figure 14:
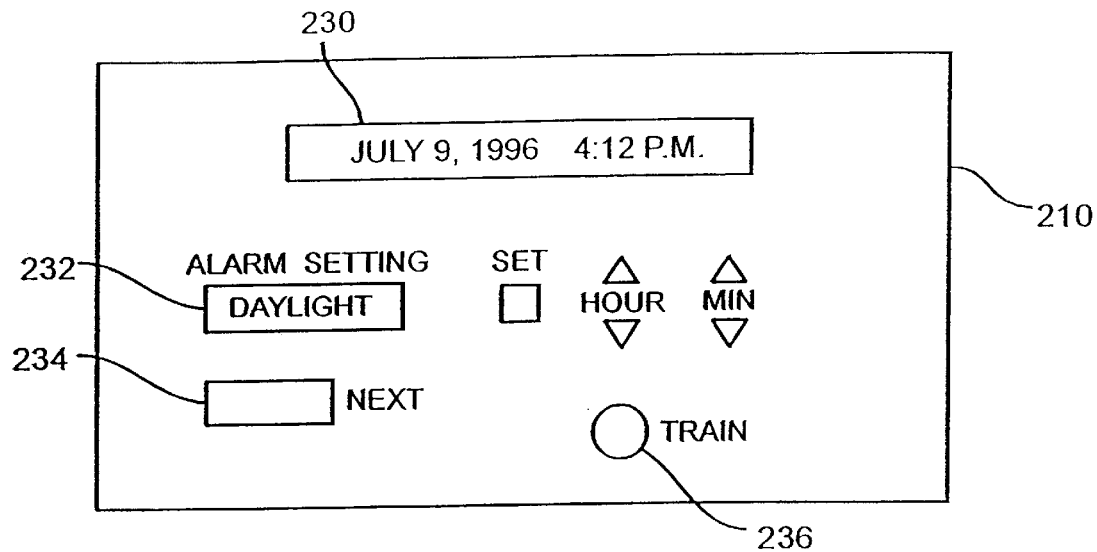
FIG. 14 illustrates the front panel of a programmable clock according to a preferred embodiment of the present invention.

The programmable clock 210 broadcasts messages over the power lines at certain significant times, i.e., sunset, sunrise, and at times selected by the user. FIG. 14 illustrates the front panel of a preferred embodiment of the programmable clock 210. In the preferred embodiment, the programmable clock has a display 230 to display the current date and time. The second display 232 is used to display events, i.e., sunrise, or intervals, i.e., night, that are either preprogrammed or programmed by the user. Next button 234 allows the user to scroll through the events or intervals. The user can select particular events or intervals using the Set, Hour and Minute buttons. In a preferred embodiment, the programmable clock 210 includes a train button 236 so that programmable devices coupled over the power lines 224 can be programmed based on events, i.e., sunrise; or intervals, i.e., night. For example, to program a lamp to turn on at sunset, the user would press the train button on a programmable controller, press the train button on the clock interface and then select the event "sunset" and then turn on the lamp that was to be turned on at sunset. If the user wished to program a lamp to come on when a door was opened but only when it was dark out, the user might use the sequence:

press train button on a programmable controller open the door press train button on the clock select the interval "night time" from the clock display press the train button on the clock again turn on the lamp that is to come on when the door opens and it is dark out press the train button on a programmable controller again Variations in this sequence could be defined by one skilled in the art to suit the needs of particular installations or types of users.

Alternatively, the programmable clock need not have a train button to program appliances according to time. Instead, one can put another programmable controller in its training mode, select a time interval or event using the programmable clock as the trigger event, place selected programmable devices in their program state and take the programmable controller out of training mode to complete programming. Upon the next occurrence of the time interval or event used as the trigger event, the selected programmable devices will go to their programmed state.

To clear a time based program, one simply presses the train button, selects the interval for which programming is to be cleared and presses the learn button again.

Figure 15:
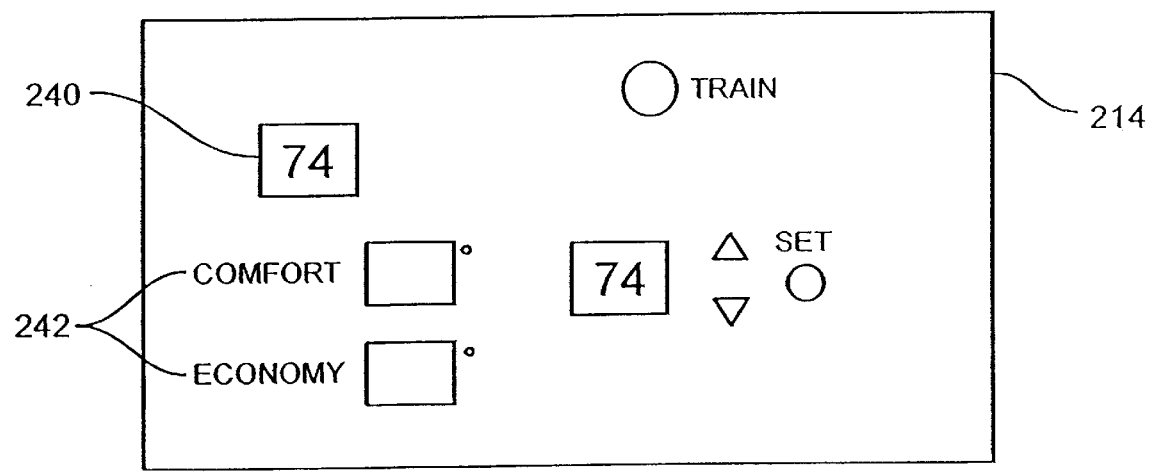
FIG. 15 illustrates a front panel of a programmable thermostat according to a preferred embodiment of the present invention.

FIG. 15 illustrates a preferred embodiment of a front panel of programmable thermostat 214. The thermostat 214 has a display 240 to display temperature and displays 242 to indicate whether comfort or economy made has been selected. Because the thermostat 214 runs at low voltages supplied by the HVAC interface 11 it would be difficult, both in design and installation, to build a thermostat that could get a signal to and from the power line. Instead, according to a preferred embodiment, the thermostat 214 includes a plug-in module (not shown) that will relay the messages between the thermostat 214 and power lines 224 over an RF transceiver (not shown). Preferably, both the RF transceiver and the thermostat 214 will have an LED (not shown) that will blink whenever there is a transmission to ease installation by verifying the RF signal path. Alternatively the thermostat can be linked to the power line 224 using a two piece configuration where the thermostat would be linked to a box near the furnace by the existing thermostat wire. The box will communicate with the thermostat over a serial data interface and provide contact closures on screw terminals for the furnace and air conditioning. The box will also have an AC line cord which will provide its power and a connection for a power line transceiver.

In order to program the thermostat 214 to go to an economy setting whenever a wall switch near a front door is pressed the programmable controller might ordinarily need to know what commands to send to a particular thermostat to cause it to enter economy mode. The preferred embodiment of the present invention simplifies this problem. To cause the thermostat to enter economy mode when a switch is pressed, the user would start as usual by pressing the train button on a programmable controller and manipulating the switch that was to be the trigger event. The user would then press the train button on the thermostat, press the economy mode, and then press the train button again. When the train button on the thermostat was pressed a second time, the thermostat would broadcast a message that contained the instructions it should be sent in order to duplicate the effect the user had just produced by manipulating the thermostat's controls. The programmable controller would receive this message and store it. Later on when the trigger event occurred, the programmable controller would read the stored message and broadcast it for the thermostat to receive and act on. Of course, rather than just put the thermostat in economy mode, the user could have done any sequence of operations (for example, defining the temperature for economy mode and then placing the unit in economy mode) after pressing the thermostat's train button. An appliance could be constructed so that manipulating the controls after pressing the train button might or might not cause the appliance to immediately alter its functioning in accordance with the user input. For example, if the appliance were a complicated lighting fixture, it might be desirable for the user to observer the consequences of changing the controls. Alternatively if the appliance were a security system it might not be desirable to change the state of the security system when programming a controller. It is assumed that one skilled in the art could define the most appropriate way to apply the teachings presented here to particular devices.

Figure 16:
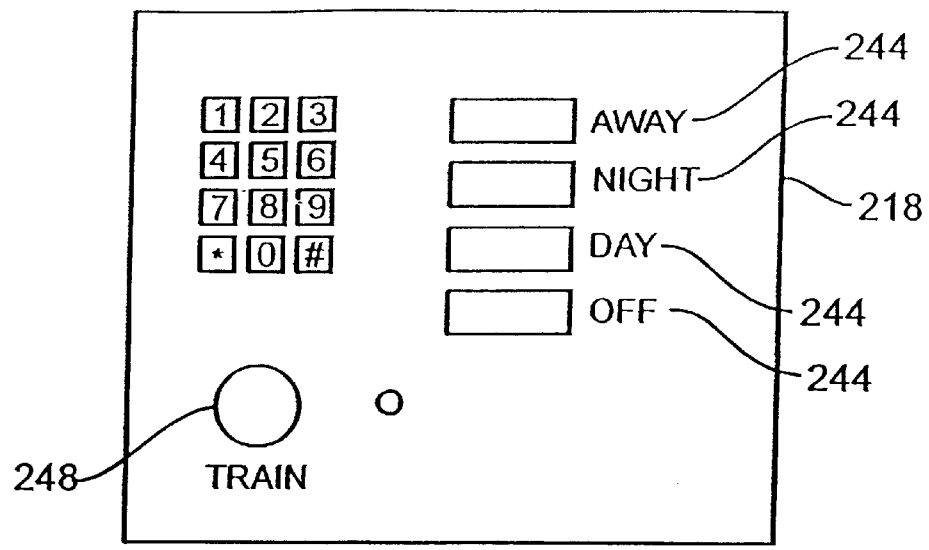
FIG. 16 illustrates a front panel of a security interface according to a preferred embodiment of the present invention.

FIG. 16 illustrates the front panel of a security interface 218 according to a preferred embodiment of the present invention. The security interface 218 includes a group of conditional buttons 244 and an action button 246. It may also have its own train button 248. To train the house to do something when the security system is in a particular state, i.e. off, on, away, night, the user places a programmable controller in training mode, selects the security system state which provides the trigger event and places select programmable devices in a programmed state. To activate the security system in response to a trigger event the user would first press the train button on a programmable controller and then cause the trigger event to occur. The user would then press the train button on the security system and then operate the controls of the security system in a way that would normally cause it to enter the desired state. The user would then press the train button on the security system a second time which would cause the security system to broadcast a message to the programmable controller that would contain the commands the security system should be sent to cause the same effect as was produced by the user's manipulation of the controls. At the designer's option, a security interface could be constructed so that after the train button was, pressed, user manipulation of the controls might have no effect on the current operation of the security system.

Figure 17:
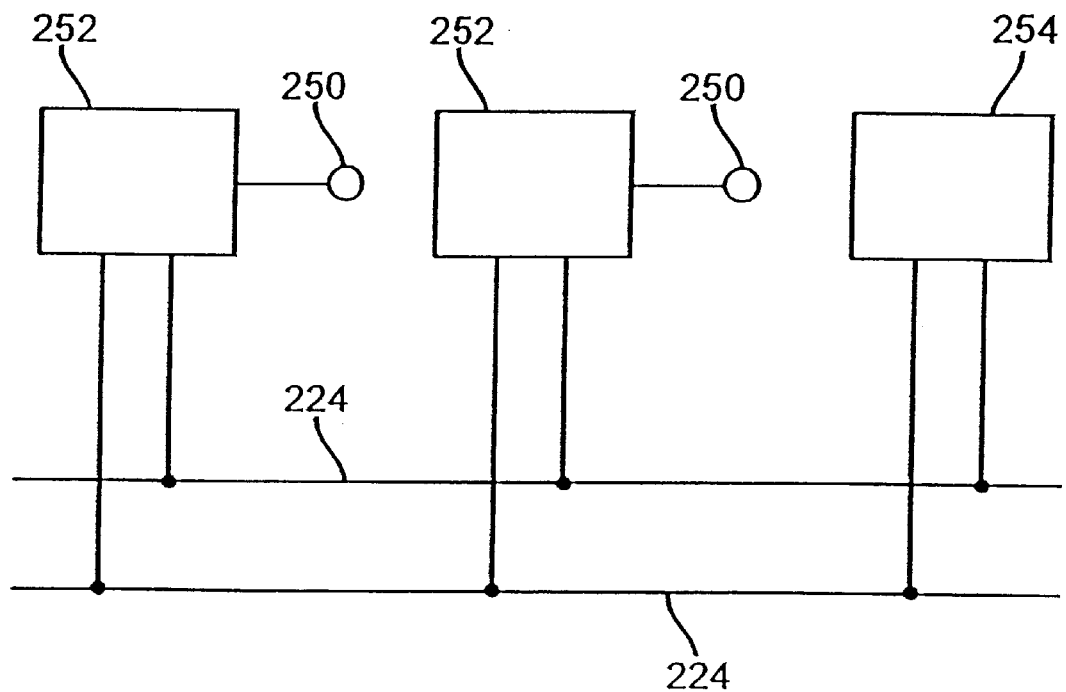
FIG. 17 is a schematic of a remote programmable light fixture.
Figure 18:
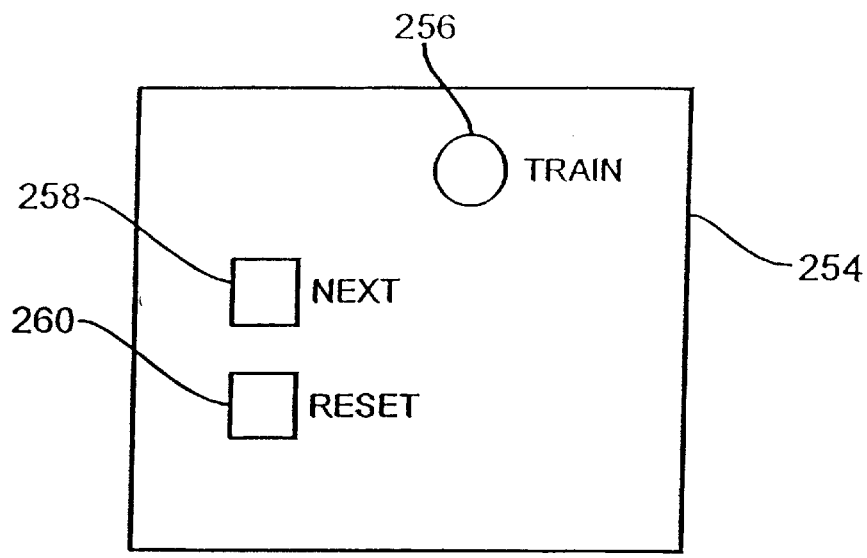
FIG. 18 illustrates a front panel of a sequence interface according to a preferred embodiment of the present invention.

FIG. 17 is a schematic of a remote programmable lighting fixture. The light fixture includes a plurality of remotely located lamps 250, for example, recessed ceiling lights, programmable devices 252 coupled to the lamps 250 that can receive message from the power lines 224 and broadcast messages over the power lines and a programmable sequencer 254 coupled to the power lines. FIG. 18 illustrates the front panel of a programmable sequencer interface according to a preferred embodiment of the present invention. The interface includes a train button 256, a next button 258, a reset button 260 and a select button 262.

In the preferred embodiment, the programmable controller is used with a bank of momentary contact switches to associate arbitrary sets of ceiling lights with the various switches. The user begins by pressing the train button on the programmable controller. The user then presses the train button on the programmable sequencer which causes all of ceiling lights to be extinguished. The user then presses the "next" button on the programmable sequencer, which causes one light to be illuminated, and presses the momentary contact switch the user would like to have control that light. Of course, any one light can be associated with several switches. After the switch or switches have been pressed, the user presses the next button again which extinguishes the first overhead light and illuminates the second. The user proceeds through all of the overhead lights, assigning to each light one or more switches that will turn it on and off When the sequencer has illuminated each light in the set in turn, it could so indicate by illuminating all the lights. While only two ceiling lamps are illustrated the present invention is not limited to the particular embodiment illustrated.

Including the elements shown in FIG. 13 allows more complicated programming. For example, if the user wants to train a programmable controller to turn on a lamp when the front door is opened and it is night, the user places the programmable controller in the training mode and opens the front door. The user signals that the actions consequent on opening the door are conditional on a timer event by first selecting the appropriate time or interval on the programmable clock 210. The user then presses the train button on the clock interface. After defining the conditional event, the user then "touches" the lamps that are to be turned on or off when the front door opens and finally takes the programmable controller out of the training mode. After this training the lamps touched by the user will go on or off when the door is opened and it is night. If a user wants to train a switch to turn off the lights, turn the security system on and turn the thermostat down the user, puts a programmable controller in training mode, depresses a switch to provide the trigger event, turns the security system on using the controls on the security system interface, and presses the setback switch on the thermostat interface and takes the programmable controller out of training mode.

If the user wants to train the house to turn off some light and put the thermostat in "economy" mode when the security system is in "away" mode, the user puts a programmable controller in training mode, presses an intelligent switch to provide the trigger event, turns off the lights, presses the train button on the security interface panel and then presses the Away button. The user then presses the train button on the security interface panel a second time, presses the train button on the thermostat interface, press the "economy" button, and then presses the train button again. The user then takes the programmable controller out of training mode.

Figure 19:
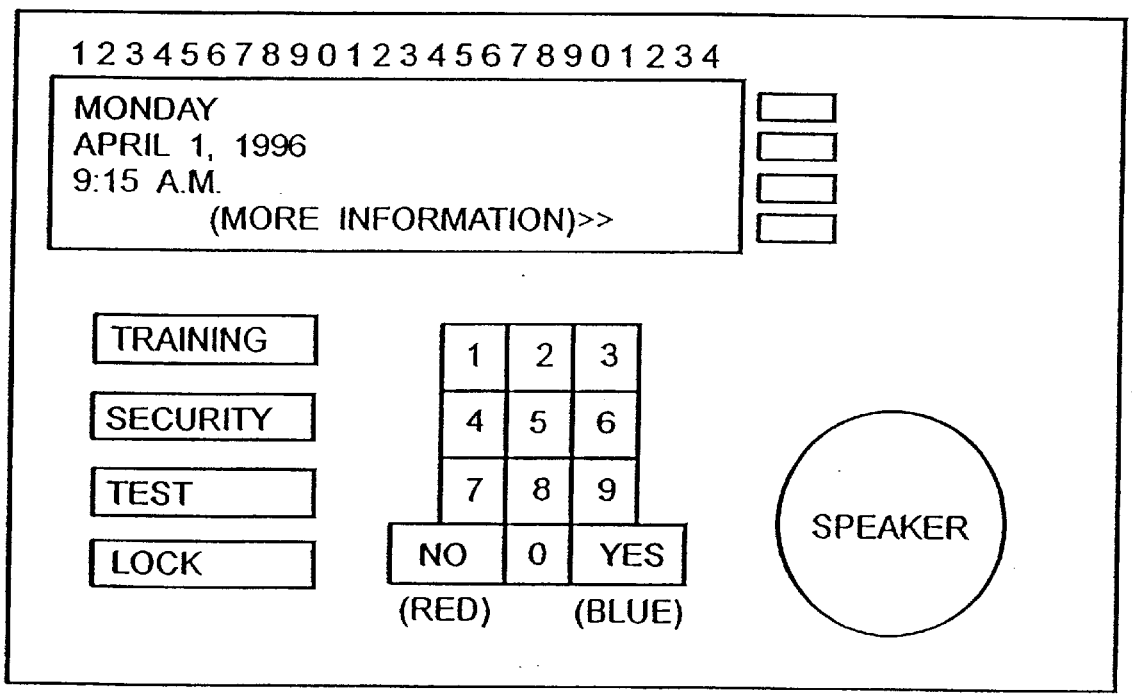
FIG. 19 illustrates a front panel of a whole house controller according to a preferred embodiment of the present invention.

In another embodiment, the individual components of the master clock module 210, security interface and panel 218 and 220 shown in FIG. 13 may be located in a whole house controller that is coupled to the power lines. FIG. 19 illustrates the front panel of the house controller according to a preferred embodiment of the present invention.

The whole house controller is preferably a menu driven device. In FIG. 19 we show a line drawing of a user console for one preferred embodiment of a whole house controller. Included on its front panel is a display with several lines of text. Aligned with some of these lines of text are buttons located on one or both sides of the display. When menus are presented, users make selections by pressing the button aligned with their choice. To make it easier for users to see which text line is aligned with which button, it is common to place an arrow or other character on the line of tet pointing to the button that should be pressed. For illustrative purposes, the menus shown here assume a display with 4 lines and 25 characters per line. Normally the panel will be in the Idle state and will display Menu 0.1:

|  |  |  |
|---|---|---|
| Monday | | |
| Apr. 1, 1996 | | |
| 9:15 am | | |
| More Information | >> | [Menu 0.1] |

If the user presses the side button>>on line 4 (More information), the system will display Menu 0.2:

|  |  |
|---|---|
| Security: Off | |
| Console not locked | |
| 3 Sensors Bypassed | |
| 4 Active Passcodes | [Menu 0.2] |

The user console also includes a numeric keypad, that we show arranged as a touchtone pad on a telephone would be, with a red key placed where the "*" key is conventionally found and a blue key where the "#" key is typically located. The Red button labeled No is typically used to abort operations in progress, to terminate some automated sequence of events, or to retire an alarm. Normally an aborted operation will bring the system back to idle state with Menu 0.1 on the display. The Blue button labeled Yes is typically used to indicate that the user had completed input. Pressing the Blue button during a confirmation message will erase the message and move on to the next screen.

When the console is in the Idle state, the four function buttons (Automation, Security, Test, and Lock) can be used to invoke procedures to create home automation programming, administer the security system, test home automation and security functions, and lock various parts of the system.

Pressing the console button labeled "Training" will cause the system to display Menu 1.0:

|  |  |  |
|---|---|---|
| Home Automation | | |
| Train House | >> | |
| Explore System | >> | [Menu 1.0] |

Selecting "Train House" lets the user teach the house new responses to trigger events, "Explore System" lets the user practice training the house without over writing any existing programming. Selecting Train House in Menu 1.0 will generate a dialog where the user is asked if the house's response is to be triggered by a switch closure. If the user says yes, the system asks the user to turn on or off the lamps and appliances to be controlled and then asks if these actions should be taken at some particular time and if the actions should depend on the state of the security system. More, particularly, Menu 1.2 is first displayed:

|  |  |  |
|---|---|---|
| Learn what to do when a | | |
| switch is pressed? | | |
| Yes | >> | |
| No | >> | [Menu 1.2] |

If the user selects Yes from Menu 1.2, Menu 1.3 is displayed:

|  |  |
|---|---|
| Press the switch you | |
| wish to use. Turn on/off | |
| devices it will | |
| control. BLUE when done | [Menu 1.3] |

If the user presses one of the switches next to the whole house controller, then that switch can be used to control any device in the house. Menu 1.4 then asks the user to decide if these response should occur at any time of the day when the switch is pressed or only during some particular period.

|  |  |  |
|---|---|---|
| The switch will control | | |
| the devices | | |
| at all times | >> | |
| only certain times | >> | [Menu 1.4] |

If the user opts for only certain times, Menu 1.5 is displayed:

|  |  |  |
|---|---|---|
| Select time: | | |
| Daylight | >> | |
| Nightime | >> | |
| Pick Start and Stop | >> | [Menu 1.5] |

If the user selects "Pick Start and Stop" from Menu 1.5, Menu 1.6 is displayed:

|  |  |
|---|---|
| Enter Starting Time | |
| Hour: Minute, | |
| _:_AM PM | |
| Blue when done | [Menu 1.6] | then Menu 1.7 is displayed:

| |
|---|
| Enter Stopping Time<br>Hour: Minute,<br>_:_AM PM<br>Blue when done                     [Menu 1.7] |

If both times are AM or both are PM, or the first time is AM and the second is PM, Menu 1.8a is displayed:

| | | |
|---|---|---|
| Start at 9:00 am and<br>continue to 11:15 am | | |
| Correct | >> | |
| Redo it | >> | [Menu 1.8a] |

If the first time is PM and the second is AM, Menu 1.8b is displayed:

| | | |
|---|---|---|
| From 10:15 PM to<br>6:15 next morning? | | |
| Correct | >> | |
| Redo it | >> | [Menu 1.8b] |

If the user selects Redo it, at either Menu 1.8a or 1.8b, Menu 1.7 will be displayed, otherwise Menu 1.9 is displayed:

| | | |
|---|---|---|
| The switch will control<br>these devices in | | |
| all security modes? | >> | |
| a particular mode? | >> | [Menu 1.9] |

If the user selects a particular mode from Menu 1.9 menu 1.10 is displayed:

| | | |
|---|---|---|
| Select Security Mode<br>Day Night Way Off | | |
| >> To move highlight | >> | [Menu 1.10] |

If the user selected all security modes from Menu 1.9 or picked a mode from Menu 1.10, Menu 1.11 is displayed:

| | |
|---|---|
| Training Complete | [Menu 1.11] |

If the user selects "No" in Menu 1.2, Menu 1.12 is displayed:

| | | |
|---|---|---|
| Learn what to do when a<br>sensor is tripped? | | |
| Yes | >> | |
| No | >> | [Menu 1.12] |

If the user selects "Yes," Menu 1.13 is displayed:

| | |
|---|---|
| Activate trigger sensor.<br>Turn on/off devices it<br>will control.<br>BLUE when done | [Menu 1.13] |

When the system detects that a sensor that could be the trigger has been tripped, it will preferably sound the alarm for 2 seconds and display the name of the sensor (or zone) on the screen. When the user presses the Blue button, Menu 1.14 is displayed:

| | |
|---|---|
| Trigger event:<br>Front Door<br>Press Blue when done<br>Press Red to Start over | [Menu 1.14] |

After the Blue button is pressed, Menu 1.15 is displayed to ask if the house is always to respond this way to that sensor or do so only at certain times of the day:

| | | |
|---|---|---|
| The sensor will control<br>these devices | | |
| at all times | >> | |
| only certain times | >> | [Menu 1.15] |

If the user response is to select only certain times, the same dialog will occur as did for a response triggered by a switch closure and then Menu 1.16 is displayed to ask if the response is to be contingent on the status of the security system:

| | | |
|---|---|---|
| The sensor will control<br>these devices in | | |
| all security modes? | >> | |
| a particular mode? | >> | [Menu 1.16] |

If the answer is a particular mode, Menu 1.17 is displayed.

| | | |
|---|---|---|
| Select Security Mode<br>Day Night Away Off | | |
| >> To move highlight | >> | [Menu 1.17] |

If the user indicates the trigger is neither a switch nor a sensor, Menu 1.18 is displayed:

| | | |
|---|---|---|
| Learn what do to at a<br>particular time? | | |
| Yes | >> | |
| No | >> | [Menu 1.18] |

If the user responds Yes to Menu 1.18 then Menu 1.19 is displayed:

| | | |
|---|---|---|
| Do something at | | |
| Sunset | >> | |
| Sunrise | >> | |
| Enter a time | >> | [Menu 1.19] |

If the user selects Enter a time from Menu 1.19, Menu 1.20 is displayed:

| | |
|---|---|
| Hour: Minute, | |
| _:_AM PM | |
| Blue when done | [Menu 1.20] |

After entering a time, Menu 1.21 is displayed:

| | |
|---|---|
| Turn on/off devices you | |
| want to change at | |
| <time descriptor> | |
| Press BLUE when done | [Menu 1.21] |

If the user selected Sunset or Sunrise, Menu 1.22 is displayed:

| | | |
|---|---|---|
| Should the Sunset/Sunrise | | |
| actions be done in | | |
| all security modes? | >> | |
| a particular mode? | >> | [Menu 1.22] |

If the user had selected particular times those times would be indicated instead of "Sunrise/Sunset."

If the user chooses a particular mode, Menu 1.23 is displayed:

| | | |
|---|---|---|
| Select Security Mode | | |
| Day Night Away Off | | |
| >> To move highlight | >> | [Menu 1.23] |

After the security mode is selected, Menu 1.24 is displayed:

| | |
|---|---|
| Training Complete | [Menu 1.24] |

If the user has indicated that the action is not triggered by a switch, a sensor or a timer event, Menu 1.25 is displayed:

| | | |
|---|---|---|
| Learn what to do if the | | |
| security status changes? | | |
| Yes | >> | |
| No | >> | [Menu 1.25] |

If the user selects "No," the system goes to Idle state. Otherwise, Menus 1.26 and 1.27 are sequentially displayed:

| | | |
|---|---|---|
| Select Security Mode | | |
| Day Night Away Off | | |
| >> To move highlight | >> | [Menu 1.26] |
| Turn on/off devices you | | |
| want to change when | | |
| Security is <descriptor> | | |
| Press BLUE when done | | [Menu 1.27] |

The user is then asked in Menu 1.28 if entering the selected security state will control these devices at all times or only certain times:

| | | |
|---|---|---|
| Security system will | | |
| control these devices | | |
| at all times | >> | |
| only certain times | >> | [Menu 1.28] |

Once the user has picked a time, the "Training Complete" confirmation message is displayed.

If the user would like to play with the system without permanently changing any programming, they can accept the Explore System option from the Menu 1.0 elicited by pressing the Training button on the whole house console. The sequence starts with a few screens of information and then they are given exactly the same set of prompts as would be seen if they had simply elected to train the system. After they have "written" their program, they can explore its operation. When they are finished, the program is either dumped or saved.

Additional devices such as a telephone access module can be incorporated into the home automation system and appear to other system components just like a programmable device.

While the presently preferred embodiments have been described with reference to communication over power lines, other communications between the intelligent switches and outlets may be used. For example, an RS-485 bus, proprietary bus, RF communication, etc. may be used. The important feature is that the programmable controller, trigger device and programmable device must be able to communicate.

It is to be understood that the forms of the invention described herewith are to be taken as preferred examples and that various changes in the shape, size and arrangement of parts may be resorted to, without departing from the spirit of the present invention or the scope of the claims.

What is claimed is:

1. A method of programming an appliance, the method comprising:

at a programmable controller, detecting a trigger event originated at a programmable device associated with the appliance and communicated to the programmable controller;

at the programmable controller, detecting a message originated at the programmable device;

storing a program at the programmable controller in response to the trigger event and the message; and in response to a subsequent trigger event, communicating the stored program from the programmable controller to the programmable device for controlling the appliance.

2. The method of claim 1 further comprising:

entering a training mode at the programmable controller;

monitoring a communication link between the programmable device and the programmable controller;

recording the detected trigger event;

recording the message; and exiting the training mode.

3. The method of claim 1 further comprising:

entering a training mode at the programmable controller;

monitoring a communication link between the programmable device and the programmable controller;

identifying from the trigger event an identifier associated with the programmable device;

recording the detected trigger event and the identifier;

identifying in the message an address associated with the programmable device; and exiting the training mode.

4. The method of claim 1 further comprising:

exiting a training mode at the programmable controller;

monitoring a communication link between the programmable device and the programmable controller; and in response to the subsequent trigger event, retrieving from storage the stored program based on the stored program's association with the subsequent trigger event.

5. The method of claim 1 further comprising:

at the programmable controller, receiving one or more messages from the programmable device; and based on the one or more messages, creating the program for storage.

6. The method of claim 5 further comprising:

identifying program steps in the one or more messages;

combining the program steps to create the program; and in response to the subsequent trigger event, retrieving the stored program including the program steps.

7. In a system including a programmable controller and at least one programmable device in communication with the programmable controller over a communication link, a method of programming an appliance, the method comprising:

at the programmable controller, detecting a trigger event originated at a programmable device associated with the appliance and broadcast on the communication link;

at the programmable controller, detecting a broadcast message originated at the programmable device and broadcast on the communication link;

storing a program at the programmable controller in response to the trigger event and the broadcast message; and in response to a subsequent trigger event, broadcasting the stored program on the communication link from the programmable controller for reception by the programmable device for controlling the appliance.

8. The method of claim 7 further comprising:

entering a training mode prior to receiving the trigger event; and after receiving one or more broadcast messages originated at the programmable device, exiting the training mode to await receipt of the subsequent trigger event.

9. A programmable controller for a home automation system, the programmable controller comprising:

a transceiver configured to communicate with one or more remote programmable devices; and a processor configured to control the programmable controller, the programmable controller configured to receive one or more messages communicated to the transceiver from a programmable device and create a program for operation of the programmable device using the one or more messages, the programmable controller further configured to communicate the program to the programmable device in response to a subsequently received trigger signal.

10. The programmable controller of claim 9 further comprising a training mode actuator, the programmable controller configured to enter a training mode in response to actuation of the training mode actuator, the programmable controller further configured to detect a trigger communication received by the transceiver and initiate creation of the program.

11. A control method in an automation system, the control method comprising creating an appliance control program using operational signals defining operations of an operating appliance and communicated in messages from the operating appliance, and subsequently communicating the program to the appliance in response to a received trigger signal to control the appliance.

* * * * *